United States Patent [19]

Neu et al.

[11] 4,310,269

[45] Jan. 12, 1982

[54] DRILL BREAK-THROUGH SENSOR

[75] Inventors: Horst W. Neu, Torrance; Thomas Gilmore, Carson; Farrell A. McCann, Hawthorne, all of Calif.

[73] Assignee: Northrop Corporation

[21] Appl. No.: 121,994

[22] Filed: Feb. 19, 1980

[51] Int. Cl.³ .............................................. B23B 47/18
[52] U.S. Cl. ........................................ 408/11; 408/8; 408/10; 408/14
[58] Field of Search ....................... 408/14, 15, 12, 11, 408/10, 9, 8

[56] References Cited

U.S. PATENT DOCUMENTS

| 2,857,789 | 10/1958 | Robinson | 408/11 |
| 2,978,689 | 4/1961 | Tech et al. | 408/11 |
| 3,051,023 | 8/1962 | Hirsch | 408/11 |
| 3,241,402 | 3/1966 | Crowell et al. | 408/14 X |
| 3,259,023 | 7/1966 | Rieger et al. | 408/11 |
| 3,471,662 | 10/1969 | Berchtold | 408/14 X |
| 3,515,100 | 6/1970 | Keller | 408/14 X |
| 3,973,858 | 8/1976 | Poisson et al. | 408/14 X |

FOREIGN PATENT DOCUMENTS

| 2306706 | 9/1973 | Fed. Rep. of Germany | 408/10 |
| 197808 | 8/1978 | United Kingdom | 408/8 |
| 258812 | 12/1969 | U.S.S.R. | 408/8 |
| 285451 | 1/1971 | U.S.S.R. | 408/12 |

Primary Examiner—William R. Briggs
Attorney, Agent, or Firm—Edward A. Sokolski

[57] ABSTRACT

An improved power drill having means for sensing when the drill bit has penetrated through the workpiece and for then retracting the drill bit from the workpiece. An electrical signal responsive to the axial force between the drill and the drill bit is used to sense when the drill bit pierces the workpiece. A sudden decrease in the axial force triggers a mechanism for retracting the drill bit from the workpiece. Means are included to detect broken bits, missing bits and previously drilled holes.

4 Claims, 3 Drawing Figures

DRILL BREAK-THROUGH SENSOR

BACKGROUND OF THE INVENTION

1. Field of the Invention

This invention pertains to power drills for automatically drilling holes through a workpiece. More particularly, the invention pertains to devices for monitoring the operation of the drill and for automatically controlling its operation so that the drill performs in a desired manner.

2. Description of the Prior Art

There are many inventions in the prior art which in some manner automatically control the operation of a power drill. For instance, L. W. Hirsch in U.S. Pat. No. 3,051,023 describes an automatic drill having an axial thrust sensor which monitors the drilling resistance encountered by a drill bit and which retracts the drill bit to avoid breaking the bit when the drilling resistance is excessive. Hirsch, however, makes no provision for sensing when the drill has penetrated through the workpiece. Under circumstances where normal drilling resistance is encountered, the drill bit retracts only when it has advanced a preselected distance.

U.S. Pat. No. 2,857,789 by Robinson is similar to that of Hirsch in that the drill bit automatically retracts when the drilling resistance is excessive. After the drill bit has penetrated the workpiece, it advances rapidly to a preselected position and then automatically retracts. Again, no provision is made for sensing drill bit break-through and for the retraction of the bit immediately thereafter U.S. Pat. No. 3,259,023 by R. F. Rieger et al., U.S. Pat. No. 3,584,524 by Langenbach, U.S. Pat. No. 3,107,903 by Newton, and U.S. Pat. No. 3,545,310 by Porath et al. similarly deal with devices for avoiding excessive loads on drill bits in power drills so as to reduce drill breakage, by stopping the advance of the drill bit or by automatically retracting the drill bit or by giving a warning signal. None of these patents provide for the immediate retraction of the bit following drill bit break-through.

In the inventions of the prior art, when the drill bit has penetrated through the workpiece, the bit continues to advance until reaching some preselected position. Where there are no parts of an assembly located adjacent to the far surface of the workpiece, penetration by the drill through the workpiece to a point beyond that necessary to complete the hole causes no problem and the inventions of the prior art can be used successfully in such circumstances. However, where some parts of an assembly are located in close proximity to the far side of the workpiece, some means must be included for limiting the penetration of the drill bit beyond that necessary to complete the hole. If an automatic drill is used to drill only flat panels of constant thickness, a preselected limit switch, such as that described in the prior art, can be used to avoid excessive penetration. However, if the panels being drilled are not flat or if they vary in thickness, means other than those described in the prior art must be used to avoid damaging assemblies located near the far surface of the workpiece. The invention disclosed in this specification senses the moment when the drill bit breaks through the far surface of the workpiece and causes the drill bit to retract immediately after the hole is completed, thus avoiding damage to nearby assemblies. Furthermore, the invention needs no adjustment to drill holes in surfaces of different thickness. Also, because the drill advances only as far as is needed to complete drilling of the hole, the time required to drill each hole is reduced.

SUMMARY OF THE INVENTION

This invention monitors the axial thrust exerted on a drill bit by the power drill. When the drill bit has penetrated entirely through the panel being drilled, the axial force exerted by the drill bit upon the drill spindle decreases suddenly and this sudden decrease in axial force is used to trigger an automatic mechanism for withdrawing or retracting the drill bit from the workpiece.

DESCRIPTION OF THE PREFERRED EMBODIMENT

Figure 1:
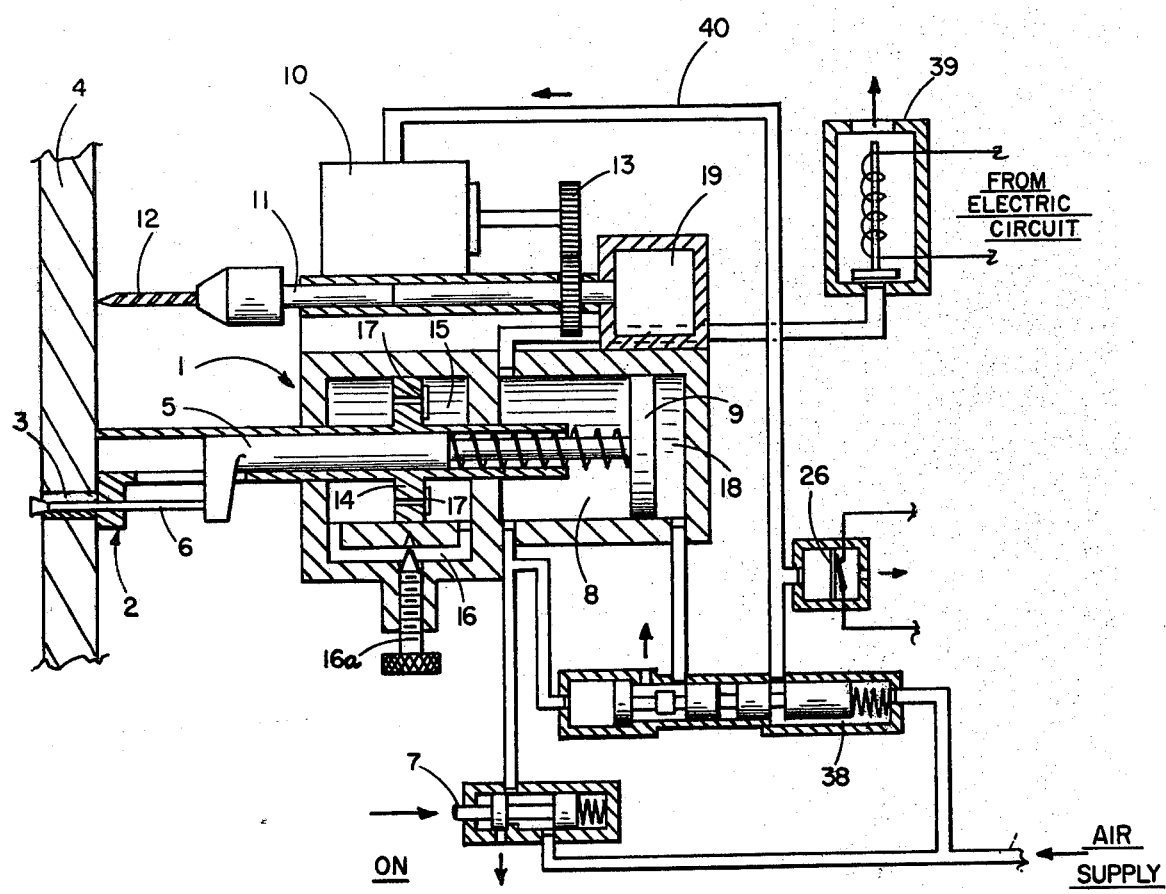
FIG. 1 is a functional diagram of the mechanical portions of the invention.

The invention is an improvement on a power drill, such as the Winslow Spacematic Model 6000, manufactured by Deutsch Fastener Corporation, 7001 West Imperial Highway, Los Angeles, Calif. 90045. The Spacematic Drill is an air-powered drill, parts of which are depicted functionally in FIG. 1. Referring to FIG. 1, the drill body 1 has a work clamp 2 which is slidably attached thereto. Work clamp 2 has an expandable collar 3 which is inserted into a previously drilled hole in workpiece 4. Also slidably attached to the body 1 is a draw rod 5 which in turn is connected to lift finger 6 which is slidably located within collar 3. When trigger valve 7 is placed in the "on" position as depicted in FIG. 1, air from an air supply passes through trigger valve 7 into chamber 8 located within drill body 1. The air in chamber 8 pushes on piston 9 causing it and draw rod 5 to which it is attached to move and retract lift finger 6 within collar 3. The end of lift finger 6 which has an expanded cross section is thereby retracted partially into collar 3, causing collar 3 to expand within the previously drilled hole so as to firmly hold the work clamp 2 against workpiece 4.

The continued introduction of air into chamber 8 causes further displacement of piston 9 relative to drill body 1 which in turn causes drill body 1 to slide along the cylindrical portion of clamp 2 towards workpiece 4. Drill motor 10, drill spindle 11 and drill bit 12, which are attached to drill body 1, are carried by the motion of drill body 1 towards workpiece 4, thus causing drill bit 12 to be advanced towards and brought into contact with workpiece 4.

Operation of trigger valve 7 also causes main air valve 38 to operate (move to the right in FIG. 1), which, in turn, directs air from the air supply to the air powered drill motor 10. The air supplied to drill motor 10 through pneumatic line 40 causes the motor to rotate which, in turn, through gears 13, rotates spindle 11 which, in turn, rotates drill bit 12 so as to drill through workpiece 4.

Included within drill body 1 is a piston 14 which is attached to work clamp 2, which piston moves within an oil-filled chamber 15 in drill body 1 to dampen the motion of drill body 1 as it advances towards workpiece 4. The rate of advancement is controlled by needle valve 16a located within body passage 16 connecting the fore and aft portions of chamber 15. Bypass valves 17 located within piston 14 allow drill body 1 to retract quickly from workpiece 4.

If, during the drilling process, trigger valve 7 is released, the air in chamber 8 vents through trigger valve 7. The reduced air pressure at the left-hand end of main air valve 38 allows main air valve 38 to move to the left, thus admitting air into chamber 18 within drill body 1 which air drives piston 9 to the left, thus causing drill body 1 to move to the right relative to lift finger 5 and work clamp 2, thus retracting drill bit 12 from the workpiece and eventually causing lift finger 6 to move to the left relative to collar 3, thus releasing work clamp 2 and drill body 1 from the workpiece.

When main air valve 38 moves to the left, it also turns off the air supply to drill motor 10, thus stopping rotation of drill bit 12.

The invention disclosed here consists of the addition to the power drill described above of a sensor to detect when drill bit 12 has penetrated through or "broken through" workpiece 4, and the addition of electronic circuitry to trigger the mechanism for retracting drill bit 12 when drill bit "break-through" occurs.

Figure 2:
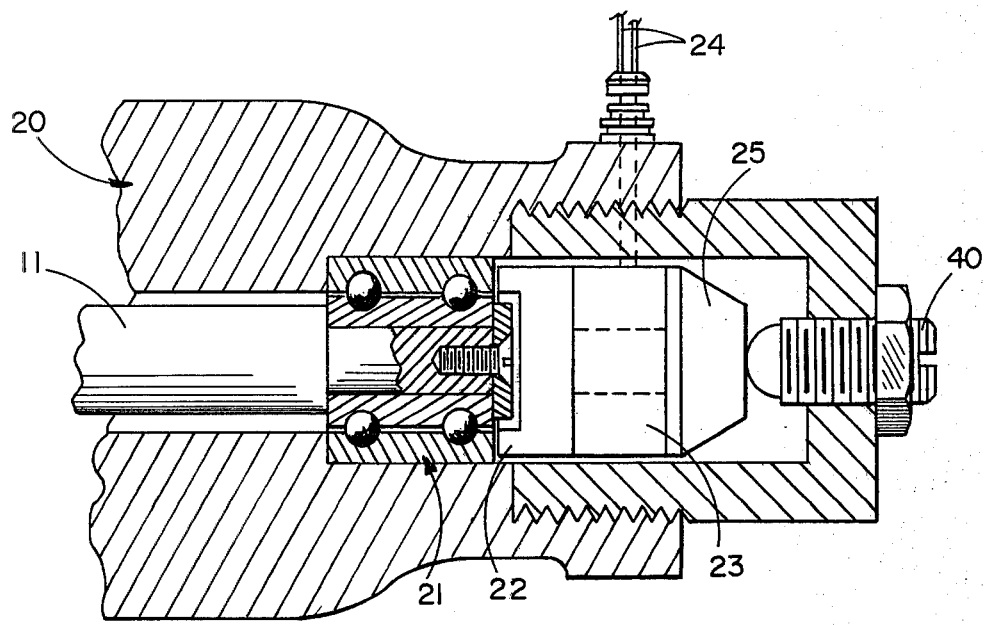
FIG. 2 is a detailed illustration of the axial thrust sensor.

Referring again to FIG. 1, axial thrust sensor 19 is attached to the end of spindle 11 to sense the amount of axial thrust exerted on spindle 11 by drill body 1 through axial thrust sensor 19. Referring now to FIG. 2, which shows in detail the construction of axial thrust sensor 19. The end of spindle 11 is supported within housing 20 of axial thrust sensor 19 by means of bearing 21. Bearing 21 consists of ball bearings located in two circumferential ball races so as to transfer axial forces to thrust washer 22 and radial forces to housing 20. The outer race of bearing 21 is slidably located within housing 20 so that an axial load on spindle 11 will cause bearing 21 to push against thrust ring 22 which in turn compresses piezoelectric disc 23. Preload screw 40 exerts a preselected axial force on preload washer 25 which, in the absence of an axial load on spindle 11, imposes a preselected amount of axial compression on piezoelectric disc 23, thrust ring 22 and bearing 21. Piezoelectric disc 23 is made out of a piezoelectric material, such as quartz, and can be in the form of a disc, a washer, or any other shape suitable for withstanding and sensing axial compression loads on the sensor. Axial thrust sensors such as that depicted in FIG. 2 are well known in the art and are commercially available. However, such a sensor has not been used previously in conjunction with a power drill as a drill break-through sensor.

Changes in the axial compression of piezoelectric disc 23 cause layers of positive and negative charges to appear on opposing surfaces of piezoelectric disc 23, which charges, in turn, produce a voltage between electrical conductors 24. Under constant compression, the surface charges on piezoelectric disc 23 quickly "leak" and decay to zero. Later, when the axial compression on piezoelectric disc 23 is reduced, charges opposite to that which appeared upon compression, momentarily appear upon opposing surfaces of piezoelectric disc 23 and in turn create a voltage between connectors 24 which is opposite in polarity to that produced by compression. Thus, in operation, when drill bit 12 first strikes workpiece 4, a positive voltage momentarily appears between conductors 24. This voltage then decays and remains near zero during the drilling process until drill bit 12 breaks through workpiece 4. "Break-through" suddenly reduces the amount of axial compression on piezoelectric disc 23, thus producing a momentary negative voltage between conductors 24. The positive and negative voltages appearing between conductors 24 are applied to electric circuitry which in turn controls the operation of the power drill.

Referring now to FIG. 1, when drill bit 12 breaks through workpiece 4, the electrical circuitry causes air valve 39 to operate and vent the air within chamber 8. The reduced pressure within chamber 8 also causes main air valve 38 to move to the left (in FIG. 1) which in turn shuts off drill motor 10, and introduces air into chamber 18 which causes drill bit 12 to retract and work clamp 2 to be released from workpiece 4.

As described above, the drilling operation is initiated by placing trigger valve 7 in the "on" position which causes main air valve 38 to move to the right, thus opening the air passage to drill motor 10. In addition to operating drill motor 10, the air from main air valve 38 operates motion switch 26, the operation of which signals to the electronic control circuitry that the drilling operation has begun.

Figure 3:
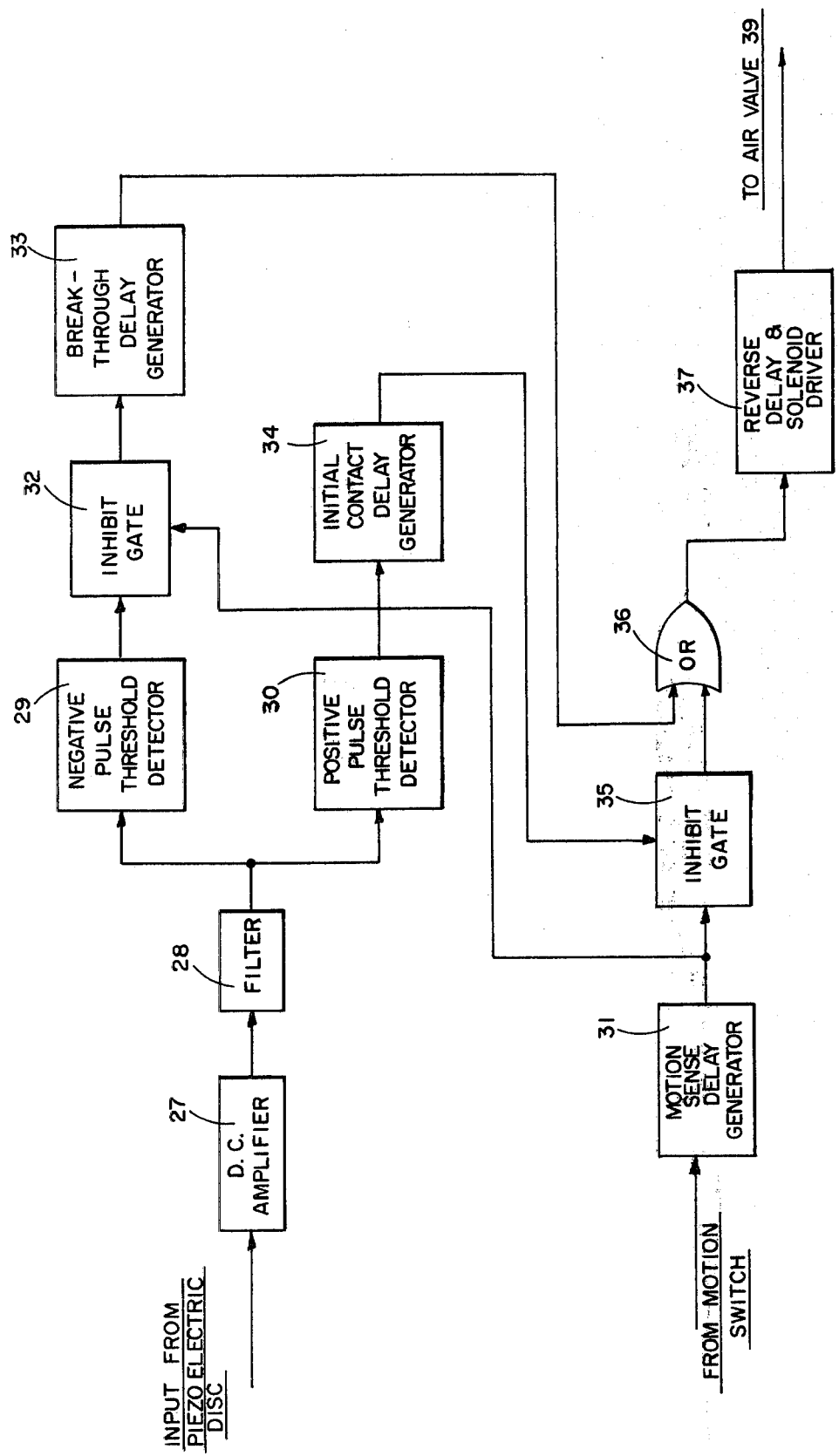
FIG. 3 is a functional block diagram of the electrical control circuitry used in the invention.

Referring now to FIG. 3, which is a functional block diagram illustrating the operation of the electronic control circuitry. The voltage output of piezoelectric disc 23 of FIG. 2 is input to DC amplifier 27 shown in FIG. 3. The amplified signal from DC amplifier 27 is input to low pass filter 28, which filter in the preferred embodiment is a simple resistor and capacitor combination that operates as an integrator with a time constant of approximately 50 milliseconds. Other low-pass filters, such as an LC filter, however, could be used in its place. Filter 28 removes the higher frequency fluctuations from the output of piezoelectric disc 23 when drill bit 12 first strikes workpiece 4, and from the negative pulse output by piezoelectric disc 23 when drill bit 12 breaks through workpiece 4.

The output from filter 28 is input to negative pulse threshold detector 29 and into positive pulse threshold detector 30. Negative pulse threshold detector 29 compares its input to a preselected negative threshold and outputs a positive voltage during the time that its input is more negative than the preselected threshold. Positive pulse threshold detector 30 compares its input to a preselected positive threshold and outputs a positive voltage during the time that its input voltage is more positive than the preselected threshold.

When the power drill begins to operate, air from main air valve 38 closes motion switch 26, illustrated in FIG. 1. The closing of motion switch 26 triggers the operation of motion sense and delay generator 31 in FIG. 3. Motion sense and delay generator 31 is a one-shot multivibrator which outputs a positive pulse for a period of 1.3 seconds following the closing of motion switch 26. The output of motion sense and delay generator 31 operates inhibit gate 32.

The output from negative pulse threshold detector 29 passes through inhibit gate 32 to the input of break-through delay generator 33 only when there is no output being received by inhibit gate 32 from motion sense and delay generator 31. Break-through delay generator 33 is a one-shot multivibrator which generates a positive pulse of 0.05 of a second in duration whenever it receives a positive input.

The output of positive pulse threshold detector 30 is input to initial contact delay generator 34 which is a one-shot multivibrator and which generates a 0.5 second positive pulse following receipt of the input signal.

The output of initial contact delay generator 34 operates inhibit gate 35. The output of motion sense delay generator 31 also is input to inhibit gate 35. The pulse output from motion sense delay generator 31 is differentiated and clipped internally by inhibit gate 35 yielding a negative pulse 1.3 seconds after the closing of motion switch 26. Inhibit gate 35 transmits this internal negative pulse to OR gate 36 only if at the time there is no inhibiting signal input to inhibit gate 35 from initial contact delay generator 34.

OR gate 36 receives the output from inhibit gate 35 and also receives and differentiates internally the output it receives from break-through delay generator 33. Whenever OR gate 36 receives a negative pulse from inhibit gate 35 or generates internally a negative pulse by differentiating the output of break-through generator 33, then OR gate 36 outputs a positive pulse to reverse delay and solenoid driver 37. Reverse delay and solenoid driver 37 is a one-shot multivibrator. An input causes reverse delay and solenoid driver 37 to output a positive pulse 1.3 seconds in length. This output is connected to air valve 39 shown in FIG. 1, and causes air valve 39 to open for a period of 1.3 seconds which releases the air from chamber 8 shown in FIG. 1, which in turn shuts off drill motor 10 and causes drill bit 12 to retract from workpiece 4 and work clamp 2 to be released from workpiece 4 as described above.

The delay of 0.05 second introduced by break-through delay generator 33 allows drill bit 12 to penetrate completely through workpiece 4 but not significantly beyond the far surface of the workpiece before drill bit 12 is withdrawn or retracted by operation of reverse delay and solenoid driver 37. If drill bit 12 is broken or if there is no bit in the drill, or there is an existing hole under the bit, then the trailing edge of the pulse from motion sense delay generator 31, which occurs 1.3 seconds after the drilling operation begins, triggers reverse delay and solenoid driver 37 and causes the drill bit 12 to retract, releases work clamp 2 and stops the drilling operation. However, if drill bit 12 strikes workpiece 4 between 0.8 seconds and 1.3 seconds after motion switch 26 closes, the positive pulse from piezoelectric disc 23 triggers initial contact delay generator 34, and causes inhibit gate 35 to operate so that the negative pulse, that is generated internally by inhibit gate 35 and which corresponds to the trailing edge of the pulse from motion sense delay generator 31, does not pass through inhibit gate 35. As a consequence, reverse delay and solenoid driver 37 is not triggered and the drilling operation continues until drill-bit break-through occurs.

In order to simplify the description of the electronic circuitry, a particular polarity has been attributed to each of the pulses generated within the various portions of the electronic circuitry. However, a particular polarity at each point in the circuitry is not required for operation of the invention. The polarity of each of these pulses could be reversed, if related changes in the circuitry were made, and the invention would still operate properly. The delay times for the various one-shot multivibrators are typical of the values used in the preferred embodiment. In a specific application, however, the actual values would have to be adjusted in accord with the parameters of the particular drill used as part of the invention.

We claim:

1. An improved power drill of the type having means for rotating a drill bit, advancing and retracting means for advancing the drill bit into a workpiece and retracting the drill bit from the workpiece, wherein the improvement comprises:
   (a) sensing means located on the drill side of the workpiece for sensing when the drill bit is encountering resistance from the workpiece; and
   (b) control means connected to the sensing means for causing the advancing and retracting means to operate to advance the drill bit so as to bring the drill bit into contact with the workpiece, and to continue to advance the drill bit into the workpiece, and to retract the drill bit from the workpiece when the sensing means has sensed that the drill bit has ceased to encounter resistance from the workpiece.

2. The device as defined in claim 1 wherein the sensing means comprises:
   (a) axial thrust sensor means for sensing the increase in axial force exerted on the drill bit by the power drill and for indicating that the drill bit has passed through the workpiece when the amount of axial thrust suddenly decreases.

3. The device as defined in claim 2 wherein the axial thrust sensor means comprises:
   (a) a piezoelectric disc located in axial alignment with the drill bit and between the drill bit and the power drill so as to be compressed by the axial force whenever the power drill exerts an axial force on the drill bit, said disc producing an electrical signal responsive to said compression; and
   (b) a preloading screw attached to the power drill and located so as to axially preload the piezoelectric disc;
   (c) a sudden reduction in the axial force on the drill bit resulting in a sudden reduction in the compression of the piezoelectric disc and a consequent sudden change in the electrical signal from the piezoelectric disc so as to indicate that the drill bit has passed through the workpiece.

4. The device as defined in claim 3 wherein the control means comprises:
   (a) amplifier and filter means for amplifying and filtering the electrical signal produced by the piezoelectric disc;
   (b) positive pulse threshold detector means responsive to the output of the amplifier and filter means for outputting a signal whenever the output of the amplifier and filter means exceeds in a positive direction a preselected positive threshold;
   (c) negative pulse threshold detector means responsive to the output of the amplifier and filter means for outputting a signal whenever the output of the amplifier and filter means exceeds in a negative direction a preselected negative threshold;
   (d) first inhibit gate means for gating through the output of the negative pulse threshold detector means at times when the first inhibit gate means is not being inhibited;
   (e) break-through delay generator means responsive to the output of said first inhibit gate means for outputting a pulse of predetermined length when the negative pulse threshold detector means output is being gated through the first inhibit gate means;
   (f) initial contact delay generator means connected to receive the output of the positive pulse threshold detector means for outputting a pulse of a predetermined length in response to said signal output of the positive pulse threshold detector means;

(g) motion sense delay generator means responsive to motion of the drill bit towards the workpiece for outputting a pulse beginning at the time that the drill bit begins to advance towards the workpiece and continuing thereafter for a predetermined period of time;

(h) second inhibit gate means for differentiating the output pulse of said motion sense delay generator means and outputting the differentiated pulse at times when the second inhibit gate means is not being inhibited;

(i) the output of the motion sense delay generator means also being connected to the first inhibit gate means so as to inhibit the first inhibit gate means whenever there is an output from the motion sense delay generator means;

(j) the output of said initial contact delay generator means being connected to the second inhibit gate means so as to inhibit the second inhibit gate means in response to a pulse output from the initial contact delay generator means;

(k) OR gate means for differentiating the pulse output of the break-through delay generator means and providing an output only when the differentiated output from break-through delay generator means or the output from second inhibit gate means is of a predetermined polarity; and (l) reverse delay and solenoid driver means for generating an electrical output signal beginning when an output is received from said OR gate means and continuing for a predetermined period of time, the output of said reverse delay and solenoid driver means operating the actuation of the advancing and retracting means so as to retract the drill bit from the workpiece.

* * * * *